United States Patent

[11] 3,573,797

[72] Inventor Sheldon Kopelson
 Newport News, Va.
[21] Appl. No. 770,209
[22] Filed Oct. 24, 1968
[45] Patented Apr. 6, 1971
[73] Assignee The United States of America as represented by the Administrator of the National Aeronautics and Space Administration

[54] RATE AUGMENTED DIGITAL-TO-ANALOG CONVERTER
 8 Claims, 3 Drawing Figs.
[52] U.S. Cl. ................................................. 340/347DA,
 235/151.11, 318/20.105
[51] Int. Cl. ........................................................ H03k 13/02
[50] Field of Search ........................................... 340/347;
 235/151.11; 318/20.105 (X)

[56] References Cited
UNITED STATES PATENTS
3,325,633 6/1967 Lukens ......................... 235/151.11
3,353,161 11/1967 Toscano ....................... 235/151.11
3,479,574 11/1969 Kosen .......................... 318/20.105
3,148,316 9/1964 Herchenroeder ............ 235/151.11

Primary Examiner—Maynard R. Wilbur
Assistant Examiner—Jeremiah Glassman
Attorneys—William H. King, Howard J. Osborn and G. T. McCoy ABSTRACT: This disclosure describes a rate augmented digital-to-analog converter for computed time-dependent data. The converter produces a smooth continuous function by digitally incrementing functions samples at a rate proportion to a predicted functional change over each sample interval. The result is continuously converted to an analog voltage. The conversion produces an output which is, in effect, the sum of a linear ramp and the function sample. The converter input data are the computed sample and the change which is predicted by the solution of an $n$th-order extrapolation formula. The computer providing the function change information to the converter also solves the $n$th-order extrapolation formula.

INVENTOR.
SHELDON KOPELSON

RATE AUGMENTED DIGITAL-TO-ANALOG CONVERTER

BACKGROUND OF THE INVENTION

The increasing complexity of simulation studies has produced, in certain critical computations, requirements for high precision which have been met by the use of digital computers. The aerospace field is an example of a field where the increasing complexity of simulation studies has resulted in the requirement for high precision computations. Precise samples of the time-dependent solutions of the simulation equations are obtained at discrete intervals, the duration of the intervals is in part determined by the time required to execute the entire solution of a set of simulation equations. Whenever a part of the simulation must remain in a continuous domain, the digital computer must be operated in conjunction with either an analog computer or analog control equipment. One of the problems that arises in such a simulation is the conversion of the quantity obtained from the digital computer at discrete intervals into accurate, continuous functions in real time.

One prior art apparatus for shifting from a digital domain to an analog domain is a zero-order-hold, digital-to-analog converter system wherein the value of one sample is held until the arrival of the next value. The result is an output that is a stairstep approximation of the continuous function. While this output can be smoothed by conventional low-pass filters, such smoothing is generally undesirable because of the excessive time lag which is introduced. Smoothing may also be effected by reducing the step intervals. The step intervals are usually reduced by programming the digital computer to calculate, in addition to the sample quantity, a set of extrapolated quantities for the succeeding sample interval. Generally, a polynomial fit to a number of preceding samples is used as the basis of the calculation. The extrapolated quantities are transferred, in order, to the converter at submultiples of the sample interval. Under some circumstances, the level of smoothing provided by a few extrapolated points is acceptable. However, a relatively large number of extrapolation calculations and date transfers are required to obtain a high level of smoothing in many situations. And, (often) the computational speed of the computer does not permit both the simulation and the extrapolation calculations within a sample interval that is consistent with the dynamics of the simulation.

Another prior art apparatus involves the addition of an analog computing circuit to the output of a digital-to-analog converter to provide a continuous linear extrapolation of the last two data samples. Extending this technique to higher-order extrapolation requires a large number of analog computing elements. One disadvantage of this apparatus is that any inaccuracies which exist in the smoothing circuit degrade the net conversion accuracy of the overall system for static as well as dynamic functions. In addition, the apparatus has the operational disadvantage of requiring one or more individual adjustments for each converted function when the sample interval is changed for different simulations.

Therefore, it is an object of this invention to provide a new and improved digital-to-analog converter.

It is another object of this invention to provide a new and improved digital-to-analog converter that is rate augmented.

It is also an object of this invention to provide a rate augmented digital-to-analog converter that provides a smooth analog output for rapidly occurring function samples.

It is a further object of this invention to provide a rate augmented digital-to-analog converter wherein data from prior function samples are used to predict the data change for a present sample so that a smooth analog signal is provided.

It is a still further object of this invention to provide a rate augmented digital-to-analog converter wherein data from prior function samples are extrapolated by solving $n$th-order equations to provide a predicted change, and the predicted change is added to a present sample on a continuous basis to provide a continuous analog output signal.

SUMMARY OF THE INVENTION

In accordance with a principle of this invention, a rate augmented digital-to-analog converter for computed time-dependent functions is provided. The converter produces a smooth continuous function signal by digitally incrementing function samples at a rate proportional to the predicted functional change over each sample interval. The output of the converter is a continuously converted analog voltage which is, in effect, the sum of a linear ramp and the function sample.

In accordance with a further principle of this invention, at the start of each discrete time interval the digital data source furnishes two quantities to the converter. The first quantity is the value of the function at that time and the second quantity is the predicted change in the function. The predicted change in the function is obtained by solving a selected $n$th-order extrapolation equation. During the sample interval, the function value is digitally incremented at a rate proportional to the predicted change concurrent with a continuous conversion of the result to an analog voltage.

It will be appreciated from the foregoing description of the invention that a rate augmented digital-to-analog converter is provided. The invention overcomes the problems of the prior art by digitally incrementing a sample signal in accordance with a predicted change so that the output signal is a smooth continuous analog signal. By utilizing an $n$th-order polynomial, a more precise analog output is achieved. That is, prior art digital-to-analog converters are limited by first order curve fitting. The invention is not so limited. In addition, prior art digital-to-analog converters are limited by offset, gain inaccuracy, drift and electrical noise. These disadvantages are also overcome by this invention. The invention also overcomes the disadvantages of prior art polynomial digital-to-analog converters, because it does not require complex computations at a rate that overloads the computing means.

It will be appreciated by those skilled in the art that the invention can be utilized with a digital computer to convert the digital output data into analog data. In addition, the invention is useful with any system that provides digital data, but needs analog data. Hence, the converter can be used with simulation systems, process control systems, data plotting systems, and some digitally driven machine tool operation control systems.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
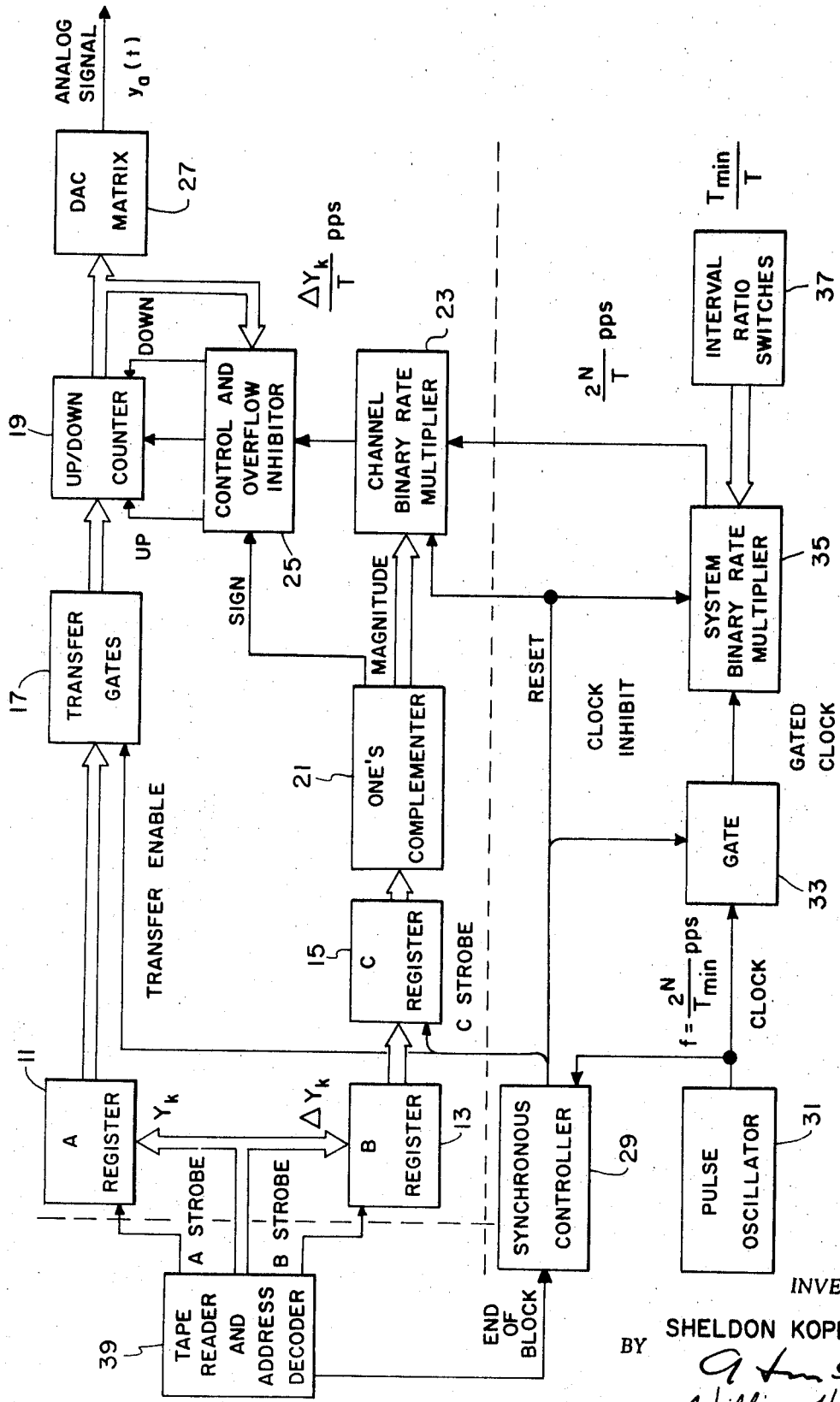
FIG. 1 is a block diagram of one embodiment of rate augmented digital-to-analog converter made in accordance with the invention.

Prior to describing the illustrated embodiments of the invention, the following description of the approximation of a continuous function by linear extrapolation is provided. The approximation of a continuous function by linear extrapolation is one of the features upon which the operation of the invention is based.

A time-varying function $y(t)$, described only by a series of function values at fixed time intervals of spacing T, may be approximated by a set of linear extrapolations $$y_a(t) = Y_k + \frac{\Delta Y_{k(t-t_k)}}{T} \qquad \left(t_k \leq t < t_{k+1}\right) \qquad (1)$$

where:

$y(t)$ is a continuous function of time, samples of which are obtained at finite intervals $y_a(t)$ is the extrapolated approximately of $y(t)$ $Y_k$ is the value of $y(t)$ at $t_k$ $\Delta Y_k$ is the total predicted change in the interval $t_k \leqq t < t_{k+1}$ $t$ is time in sec $t_k$ is the time of $k$th sample $T$ is the sample interval, $t_{k+1} t_k$ With the exception of negligible quantization increments, the output of the rate augmented digital-to-analog converter of this invention is described by equation (1). The input data from the digital computer are $Y_k$, the value of the function at the start of the interval, and $\Delta y_k$, the calculated total change over the interval.

The quantity $\Delta Y_k$ is a weighted summation of $Y_k$ and $n$ preceding points; that is, $$\Delta Y_k = c_0 Y_k + c_1 Y_{k-1} + c_2 Y_{k-2} + \ldots + c_n Y_{k-n} \quad (2)$$

where:

$c_0, c_1, c_2, \ldots, c_n$ are the weighting coefficients of $Y_k, Y_{k-1}, Y_{k-2}, \ldots, Y_{k-n}$ used in the extrapolation formula, where $k$, $k-1, k-2, \ldots, k-n$ refer to the present and previous values of $y(t)$.

The simplest method of determining the weighting coefficients for this extrapolation formula is to assume that $Y1k_{+}1$ will lie on the extension of the $n$th-order polynomial which fits the selected points. However, for second- and higher-order polynomials the coefficients can satisfy either of two criteria. One criterion is that the terminal value of the converter extrapolation be equal to the predicted next value of the function. The other criterion is that over the interval T the average difference between the linear extrapolation and the next segment of the fitted polynomial be zero. These two types of extrapolations are referred to as minimum terminal error and minimum average error, respectively. In either extrapolation the coefficients are derived by solving the equations that result from the choice of the polynomial and extrapolation criterion. And, either extrapolation can be used by the invention as hereinafter described.

It will be appreciated from the foregoing brief description of the approximation of a continuous function by linear extrapolation that each next change of a function is one of a series of function changes which can be predicted. The prediction is based on past samples (or values) of the function. Hence, by knowing several past (digital) values of the function, the next change can be predicted by solving equation (2). By adding the solution of equation (2) to $Y_k$ (prorated over the time interval), the solution to equation (1) is obtained. And, the solution to equation (1) is the analog output signal for the digital input signal creating the predicted change. It will also be appreciated that the solution to the foregoing equations is easily and rapidly accomplished by a digital computing apparatus.

Figure 3:
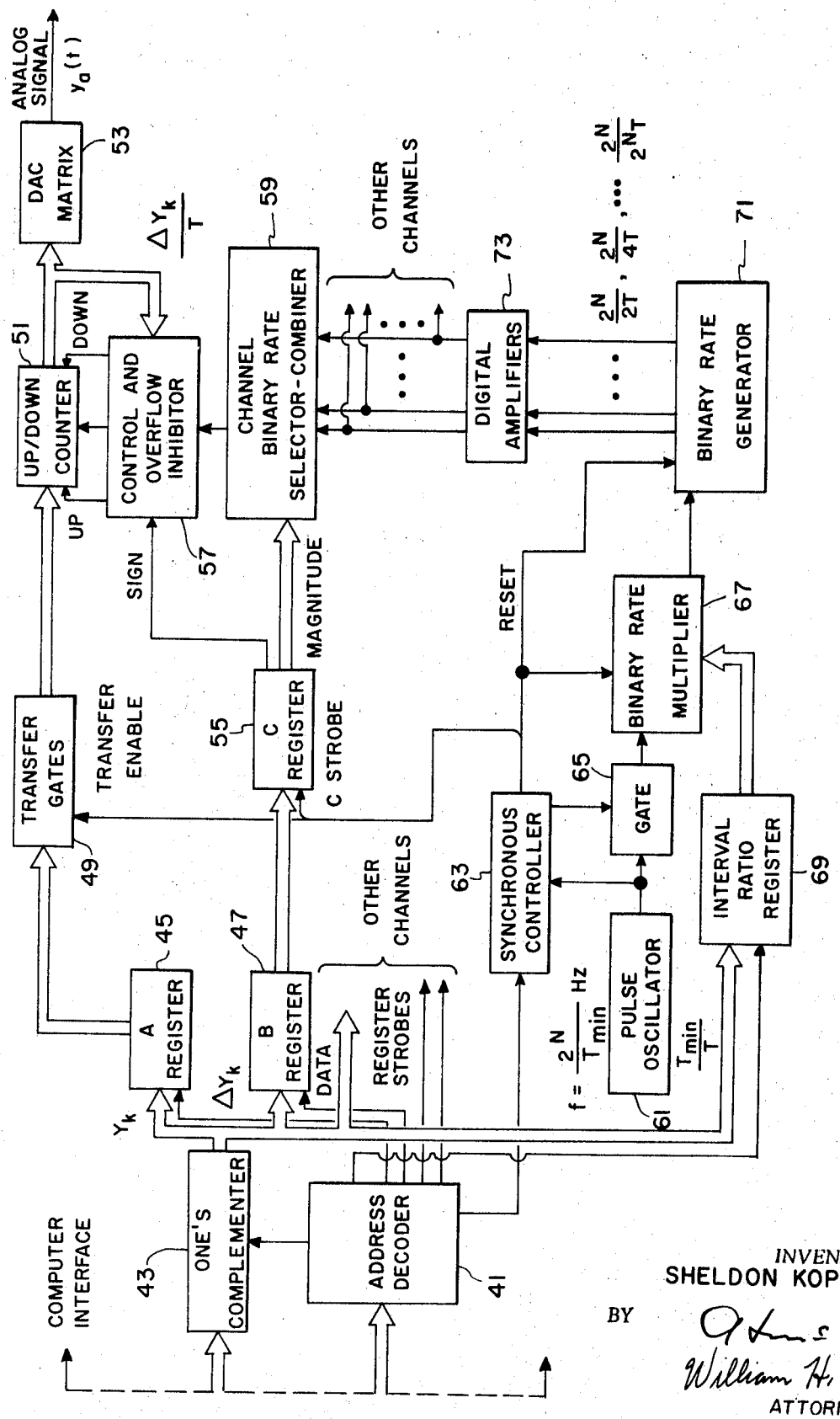
FIG. 3 is a block diagram of an alternative embodiment of a rate augmented digital-to-analog converter made in accordance with the invention.

Turning now to a description of the preferred embodiments of the invention illustrated in FIGS. 1 and 3, the embodiment of the invention illustrated in FIG. 1 comprises: an A register 11; a B register 13; a C register 15; transfer gates 17; an up/down counter 19; a one's complementer 21; a channel binary rate multiplier 23; a control and overflow inhibitor 25; digital-to-analog converter DAC matrix 27; a synchronous controller 29; a pulse oscillator 31; a gate 33; a system binary rate multiplier 35; and interval ratio switches 37. The input signal source for the embodiment of the invention illustrated in FIG. 1 is designated as a tape reader and address decoder 39, illustrated on the left of FIG. 1. Basically, the tape reader and address decoder is a source of data and extrapolated data points of the type obtained by the solution of the equations heretofore described. This data is converted by the apparatus of the invention illustrated in FIG. 1 and herein described into an analog output signal.

The data sample output $Y_k$ of the tape reader and address decoder 39 is connected to the input of the A register 11. As A strobe signal derived from the tape reader and address decoder 39 is also connected to the input of the A register 11 so as to strobe the A register when its input data is present.

The total predicted change in the sample interval $\Delta Y_K$ output of the tape reader and address decoder 39 is connected to the input of the B register 13. The B register also receives a B strobe signal derived from the tape recorder and address decoder 39. The tape reader and address decoder apparatus 39 generates a further strobe signal designated the "End of Block Signal" which is applied to one input of the synchronous controller 29.

The output of the A register 11 is connected to the input of the transfer gates 17. The transfer gates 17 have a control input signal designated "transfer enable" derived from the synchronous controller 29. The output of the transfer gates 17 is connected to the initial set input of the up/down counter 19, and the outputs of the up/down counter 19 stages are connected to the inputs of the DAC matrix 27. The output of the up/down counter 19 is also connected to one input of the control and overflow inhibitor 25.

The output of the B register 13 is connected to the input of the C register 15. The C register receives a C strobe signal from the synchronous controller 29. The output of the C register 15 is connected to the input of the one's complementer 21. The one's complementer has "magnitude" and a "sign" outputs. The magnitude output of the one's complementer 21 is connected to the input of the channel binary rate multiplier 23. The sign output of the one's complementer 21 is connected to a second input of the control and overflow inhibitor 25. The output of the channel binary rate multiplier is also connected to an input of the control and overflow inhibitor 25. The control and overflow inhibitor 25 can generate one of three output signals. One output signal is a pulse or count output signal; the second output signal is an up control signal, and the third output signal is a down control signal. Lines for these output signals are all connected to control inputs of the up/down counter 19.

The pulse oscillator 31 generates clock pulses. The output of pulse oscillator 31 is connected to a second input of the synchronous controller 29 and to an input of the gate 33. An inhibit input of the gate 33 is connected to the synchronous controller 29. The output of the gate 33 is connected to an input of the system binary rate multiplier 35. The output of the interval ratio switches is also connected to the system binary rate multiplier 35. The system binary rate multiplier also receives signals from the synchronous controller 29. The output of the system binary rate multiplier is connected to a further input of the channel binary rate multiplier 23. The channel binary rate multiplier also receives a signal from the synchronous controller 29.

From the foregoing description it will be appreciated by those skilled in the art that one of the primary differences between the rate augmented digital-to-analog converter of the invention and the prior art is that the digital-to-analog converter (DAC) matrix 27 is driven by logic signals from a binary up/down counter 19 rather than from a buffer register. In general, at the start of each sample interval, the up/down counter 19 is preset to the value of the function. The counter is then incremented or decremented by the control and overflow inhibitor at a rate which is determined by the predicted change of the function during that sample interval. The predicted change is the result of the solution, by the digital computer, of an extrapolation formula of the type heretofore described. In order to convert both positive and negative function values to analog voltages without using an inverting amplifier and a sign-control switch, the information in the up/down counter must be in numerical complement form rather than in sign-magnitude form. Hence, because the embodiment of the invention illustrated in FIG. 1 is designed for the conversion of natural binary coded information with negative numbers expressed in two's complement form, the format of the predicted-change data must be converted to sign-form, within the system, in order to control the counting operation.

Turning now to a more specific description of the operation of the invention illustrated in FIG. 1, as a tape block is read, registers A and B are loaded in sequence with quantities $Y_k$ and $\Delta Y_k$. When the end of the tape block occurs, the conversion operation for that sample is started. The transfer gates 17 are enabled so that the up/down counter 19 can be set to the $Y_k$ value which has been previously stored in the A register 11. Simultaneously, the C register 15 is set to the $\Delta Y_k$ value which was previously stored in the register 13. The transfer gates 17 are then disabled so that the up/down counter 19 can respond to the pulse inputs which it receives from the control and overflow inhibitor 25.

Conversion of the $\Delta Y_k$ information from two's complement to sign-magnitude form is necessary to provide the up/down counter 19 with a count-up or a count-down control signal and to develop a separate set of logical signals which determine the rate at which the up/down counter is pulsed. The one's complementer 21 performs a parallel one's complement to sign-magnitude conversion. Although this conversion causes an error of the least significant bit (when negative numbers are converted), its speed and simplicity far outweigh the disadvantage caused by this minor error.

The rate at which the up/down counter is pulsed is determined by the output of the channel binary rate multiplier 23. The channel binary rate multiplier's numerical multiplier input is the natural binary representation of the magnitude $\Delta Y_k$. Its multiplicand input is a pulse train of $2^N/T$ pulses per second, where $T$ is the sample interval and $N$ is the number of stages. The number of stages $N$ is related to the capacity of the overall system and may, for example, be $\pm(2^{11}-1)$. This value of $N$ is related to the precision of the digital-to-analog converters used. The output or product of the channel binary rate multiplier is a pulse train of $\Delta Y_{k/T}$ pulses per second. Consequently, in a sample interval $t_k \leq t < t_{k+1}$ the counter and, therefore, the digital-to-analog converter matrix 27 follow (in one bit increment) equation (1).

Under certain circumstances, the numerical sum of the predicted change $\Delta Y_k$ and of the actual function value $Y_k$ may exceed the range of the counter. A counter overflow (which would result in a sign reversal and, hence, an error), is prevented by the control and overflow inhibitor portion of the invention. The control and overflow inhibitor 25 tests the status of the counter and inhibits the count-up or the count-down control signal when the counter reaches plus or minus full scale, respectively.

The pulse source for the channel binary rate multiplier 23 is the output of the system binary rate multiplier 25. The pulse input to the system binary rate multiplier is a clock pulse train from the pulse oscillator 31 through the gate 33, For example, the pulse train may be at 1 MHz. In any particular system incorporating the invention, the frequency of the pulse train is determined by the maximum operating frequency of the logic elements. For scaling purposes this frequency is defined as the ratio of the converter half-range ($2^N$) to a minimum sampling interval designated $T_{min}$. The system binary rate multiplier input is the ratio of $T_{min}$ to the sampling interval T which is used for a given conversion. Hence, the output of the system binary rate multiplier is a pulse train at the rate of $2^N/T$ PPS, which is the required channel binary rate multiplier input.

In the embodiment of the invention illustrated in FIG. 1, T is the measured interval between the reading of successive tape blocks and the binary code for $T_{min}/T$ is determined by the setting of the interval ratio switches 37. In an embodiment of the invention wherein the converter illustrated in FIG. 1 is directly connected to the output of a digital computer, T is the iteration interval of a particular digital computer simulation program and the interval ratio switches are replaced by a register which is set to $T_{min}/T$ by the computer at the start of the simulation.

For a given maximum pulse oscillator frequency, the value of $T_{min}$ is determined by the choice of the converter half-range scaling constant ($2^N$) which is used to define the frequency as a binary rate multiplier multiplicand. The value of this constant is limited by its additional use in the fractional representation of $\Delta Y_k$. In this use, the constant cannot be less than the maximum value of $\Delta Y_k$ for a particular simulation problem. Considering all possible problems, the foreknowledge of the maximum values of $\Delta Y_k$ is not always available. However, a difference between successive samples in excess of $2^N$ results in a predicted value for the next sample that is off scale. With this knowledge, the sampling rate for any particular conversion can be limited so as to prevent the occurrence of off scale situations.

It will be appreciated from the foregoing description of the operation of the embodiment of the invention illustrated in FIG. 1 that the invention provides an apparatus for converting digital data into analog data without the problems presented by prior art systems. By augmenting digital functions with predicted changes, a smooth continuous analog output signal is provided.

Figure 2:
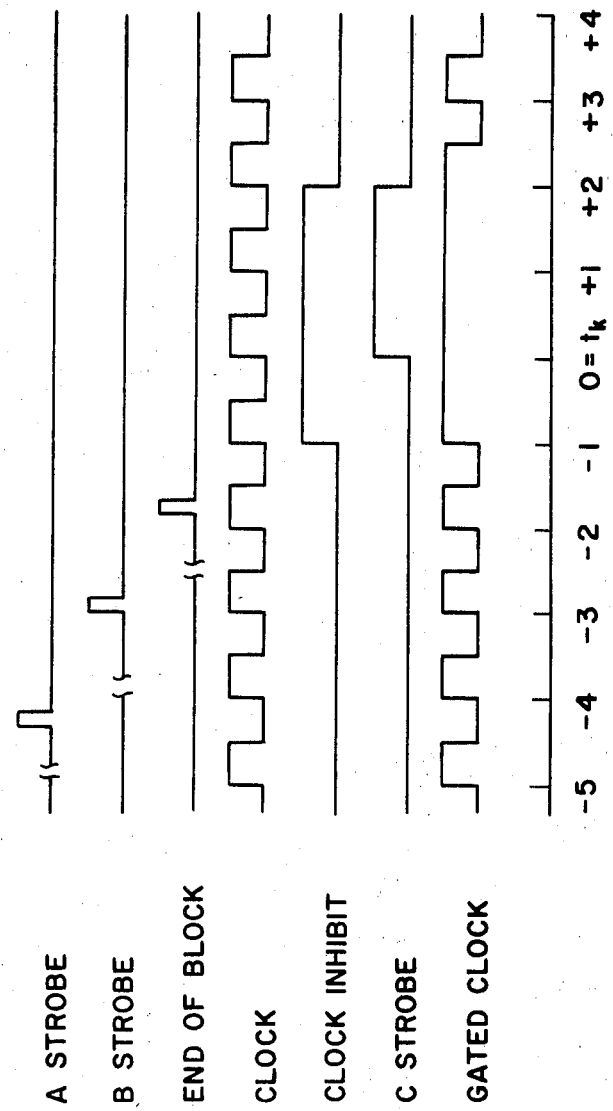
FIG. 2 is a timing diagram of the control sequence of certain portions of the embodiment of the invention illustrated in FIG. 1.

A timing diagram illustrating the general sequence of events for the embodiment of the invention illustrated in FIG. 1 is illustrated in FIG. 2. In general, the A strobe pulse occurs first and digital function data is read into the A register. Then the B strobe pulse occurs and increment data is read into the B register. Thereafter, the "end of block" pulse occurs. When the end of block pulse occurs, the synchronous controller generates a signal which transfers data in the A register through the transfer gates into the up/down counter; transfers data in the B register into the C register, and inhibits the clock pulses. After this occurs, the digital-to-analog conversion takes place for that set of $Y_k$ and $\Delta Y_k$ signals and the A and B registers are filled with the next set of $Y_k$ and $\Delta Y_k$ signals.

It will be appreciated by those skilled in the art and others that the tape reader and address decoder 39 illustrated on the left side of the vertical dashed line of FIG. 1 can be replaced by a digital computer output. In addition, it will be appreciated that the portion of the system illustrated beneath the horizontal dashed line of FIG. 1 can be utilized to control a plurality of read out channels. The embodiment of the invention illustrated in FIG. 3 and hereinafter described illustrates these changes. More specifically, the embodiment of the invention illustrated in FIG. 3 is a single channel system with means for controlling a plurality of channels. In addition, the embodiment of the invention illustrated in FIG. 3 is suitable for direct attachment to a computer to receive control signals and signals representing $Y_k$ and $\Delta Y_k$.

The embodiment of the invention illustrated in FIG. 3 comprises: an address decoder 41; a one's complementer 43; an A register 45; a B register 47; transfer gates 49; an up/down counter 51; a DAC matrix 53; a C register 55; a control and overflow inhibitor 57; a channel binary rate selector-combiner 59; a pulse oscillator 61; a synchronous controller 63; a gate 65; a binary rate multiplier 67; an interval ratio register 69; a binary rate generator 71, and digital amplifiers 73.

The address decoder 41 and the one's complementer 43 are connected through a computer interface (not shown) to a digital computer (also not shown) so as to receive digital signals representing $Y_k$ and $\Delta Y_k$ and control or strobe signals. The output from the one's complementer contains the $Y_k$, the $\Delta Y_k$ and the $T_{min}/T$ signals, as well as data ($Y_k$ and $\Delta Y_k$) signals for other channels (not shown). The $Y_k$ signal is applied to the A register 45, the $\Delta Y_k$ signal is applied to the B register 47, and the $T_{min}/T$ signal is applied to the interval ratio register 69.

The address decoder 41 generally provides timing signals for controlling the application of data to the various registers. Specifically, strobe signals from the address decoder are applied to the A register 45, the B register 47, and the interval ratio register 69. In addition, the address decoder 41 applies a control signal to the one's complementer 43 and to the synchronous controller 63. Strobe signals for the registers of other data channels (not shown) also originate at the address decoder 41.

The output of the A register is connected to the input of the transfer gates 49. The output of the transfer gates 49 is connected to the input of the up/down counter 51. The output of the up/down counter is connected to the input of the DAC matrix 53 and to the input of the control and overflow inhibitor 57. The output from the B register 47 is connected to the input of the C register 55. The C register has "sign" and "magnitude" output signals. The magnitude output sign of the C register 55 is connected to the input of the channel binary rate selector-combiner. The sign output signal of the C register is connected to an input of the control and overflow inhibitor 57. The synchronous control 63 provides a C strobe signal to the C register 55 and a transfer enable signal to the transfer gates 49 to control the C register and the transfer gates, respectively.

The pulse oscillator 61 generates a series of clock pulses which are applied to the synchronous control 63 and to the gate 65. The gate has an inhibit input connected to the output of the synchronous controller 63. The output of the gate 65 is connected to the input of the binary rate multiplier 67. The binary rate multiplier has a second input connected to the reset output of the synchronous controller 63 and a third input connected to the output of the interval ratio register 69. The output of the binary rate multiplier 67 is connected to the input of the binary rate generator 71. The binary rate generator 71 has a reset input received from the synchronous controller 63. The output of the binary rate generator 71 is connected to the input of the digital amplifiers 73. The outputs of the digital amplifiers 73 are connected to the channel binary rate selector-combiners 59 of the various channels.

In general, the embodiment of the invention illustrated in FIG. 3 operates in the same manner as the embodiment illustrated in FIG. 1 and heretofore described. However, in the embodiment illustrated in FIG. 3, cost reduction for a multichannel system is effected by the invention through the relocation of certain logic functions so that they can serve a plurality of channels. Accordingly, the one's complementer is located so that all data passes through it as the data is addressed to the individual converter channels. Specifically, because the A and B input registers of each channel may be considered to be independent for addressee purposes, an even address can be assigned to all the B registers so that a single one's complementer can service all channels by adding to it the logical elements required to assure that only data addressed to even numbered registers is complemented.

If a sign-magnitude arithmetic format is used by the computer, it is necessary to convert the format of the $Y_k$ data while leaving unaltered the $\Delta Y_k$ date. If the invention is used in such an environment, the format conversion is merely inverted (i.e., sign-magnitude one's complement) and the address logic is changed to assure that the $Y_k$ data is converted.

A further cost reduction for a multichannel system is achieved by the embodiment of the invention illustrated in FIG. 3 by separating the functions of the channel binary rate multiplier illustrated in FIG. 1 into a binary rate generator and a channel binary rate selector-combiner. Specifically, the binary rate generator is now located so that it serves all channels in the multichannel system. Its output is a parallel set of pulse trains at the rates of $2^N/2T$, $2^N/4T$, ......... $2^N/2^N$ T pps. These pulse trains are transmitted through digital amplifiers to all channels and each channel has a binary rate selector-combiner whose output is a single pulse train. For a particular channel the pulse rate in pps is $\Delta Y_k$ for the channel, divided by T.

In addition, FIG. 3 illustrates an interval ratio register which is used to change the time scaling whenever the simulation program is changed. The substitution of an interval ratio register for interval ratios when the system is directly connected to a computer has been previously discussed. In general, the fraction $T_{min}/T$, for each problem, is transferred from the computer to the register as part of the initializing routine of the digital simulation program. The interval ratio register operates on the system clock frequency; hence, time scaling for all channels is set simultaneously.

It will be appreciated by those skilled in the art and others that the invention provides a rather uncomplicated system for providing digital-to-analog conversion function. The system is rate augmented so that a considerably smoother and more accurate analog output signal is generated than is generated by prior art digital-to-analog converters. That is, the invention provides a continuously changing analog function determined by a predicted rate of change which is determined by the solution of an extrapolated equation. The equation is not as complex as prior art polynomial equations; hence, it can be easily and rapidly solved by the digital computer providing the digital data. The $\Delta Y_k$ resulting from the computation is combined with the $Y_k$ data representing the function to provide a continuously (as opposed to step) changing output signal.

I claim:

1. A rate augmented digital-to-analog converter comprising:
a first register for registering digital function data;
a second register for registering predicted digital function data changes;
up/down counter means controllable to count up and count down in accordance with input signals connected to said first and second registers to count up and count down the input from said first register in accordance with the signal from said second register;
transfer means connected between said first register and said up/down counter for transferring digital function data from said first register to said up/down counter;
a third register connected to said second register for reading out the predicted digital function data changes in said second register;
control means connected to said transfer means and said third register for controlling the transfer of data from said first register to said up/down counter means and the transfer of data from said second register to the third register;
a channel binary rate multiplier having a first input connected to said control means and a second input connected to said third register;
a control and overflow inhibitor having a first input connected to the output of said up/down counter, a second input connected to an output of said third register, and a third input connected to the output of said channel binary rate multiplier, and having its outputs connected to the control and pulse inputs of said up/down counter so as to be able to change the count in said up/down counter; and
digital-to-analog converter means connected to the output of said up/down counter means for converting the output from said up/down counter means into an analog signal.

2. A rate augmented digital-to-analog converter as claimed in claim 1 wherein said third register is connected to a one's complementer, said one's complementer having a sign output and a magnitude output, said sign output connected to an input of said control and overflow inhibitor and said magnitude output connected to an input of said channel binary rate multiplier.

3. A rate augmented digital-to-analog converter as claimed in claim 2 wherein said control means comprises:
a synchronous controller connected so as to receive a control signal at a first input;
said synchronous controller having outputs connected to said transfer means, said third register and said channel binary rate multiplier;
a pulse oscillator having an output connected to a second input of said synchronous controller;
a gate having a signal input connected to the output of said pulse oscillator and inhibit input connected to an output of said synchronous controller;
a system binary rate multiplier having a first input connected to the output of said gate and a second input connected to the output of said synchronous controller and an output connected to said channel binary rate multiplier; and
interval ratio switches having an output connected to a third input of said system binary rate multiplier.

4. A rate augmented digital-to-analog converter as claimed in claim 3 including means for connecting the date outputs of a tape reader and address decoded to the date inputs of said first and second registers and the control outputs of said tape reader and address decoder to the control inputs of said first and second register and the control input of said synchronous controller.

5. A rate augmented digital-to-analog converter as claimed in claim 1 including a channel binary rate selector-combiner, one input connected to a magnitude output of said register and an output connected to said control and overflow inhibitor, said third register having a sign output connected directly to said control and overflow inhibitor, said channel binary rate selector and combiner having a plurality of inputs connected to predetermined outputs of said control means.

6. A rate augmented digital-to-analog converter as claimed in claim 5 including:
one's complementer for receiving data and for applying it to said first and second registers; and
an address decoder for receiving address data and having a plurality of control outputs connected to said one's complementer, said first and second register, and said control means.

7. A rate augmented digital-to-analog converter as claimed in claim 6 wherein said control means comprises:
a synchronous controller having a control input connected to an output of said address decoder and having an output connected to said transfer means and said third register;
a pulse oscillator having an output connected to said synchronous controller;
A gate having a signal input connected to the output of said pulse oscillator and an inhibit input connected to an output of said synchronous controller;
a binary rate multiplier having a signal input connected to the output of said gate and a reset input connected to an output of said synchronous controller;
an interval rate ratio register having an input connected to an output of said one's complementer and a control input connected to an input of said address decoder, and having an output connected to an input of said binary rate multiplier;
a binary rate generator having a reset input connected to an output of said synchronous controller and a signal input connected to the output of said binary rate multiplier; and
a set of digital amplifiers having inputs connected to outputs of said binary rate generator and outputs connected to said channel binary rate selector-combiner.

8. A rate augmented digital-to-analog converter as claimed in claim 7 wherein said predicted digital function data changes are determined by the solution of a predetermined equation which equation results from data derived from prior digital function data.